UNITED STATES PATENT OFFICE.

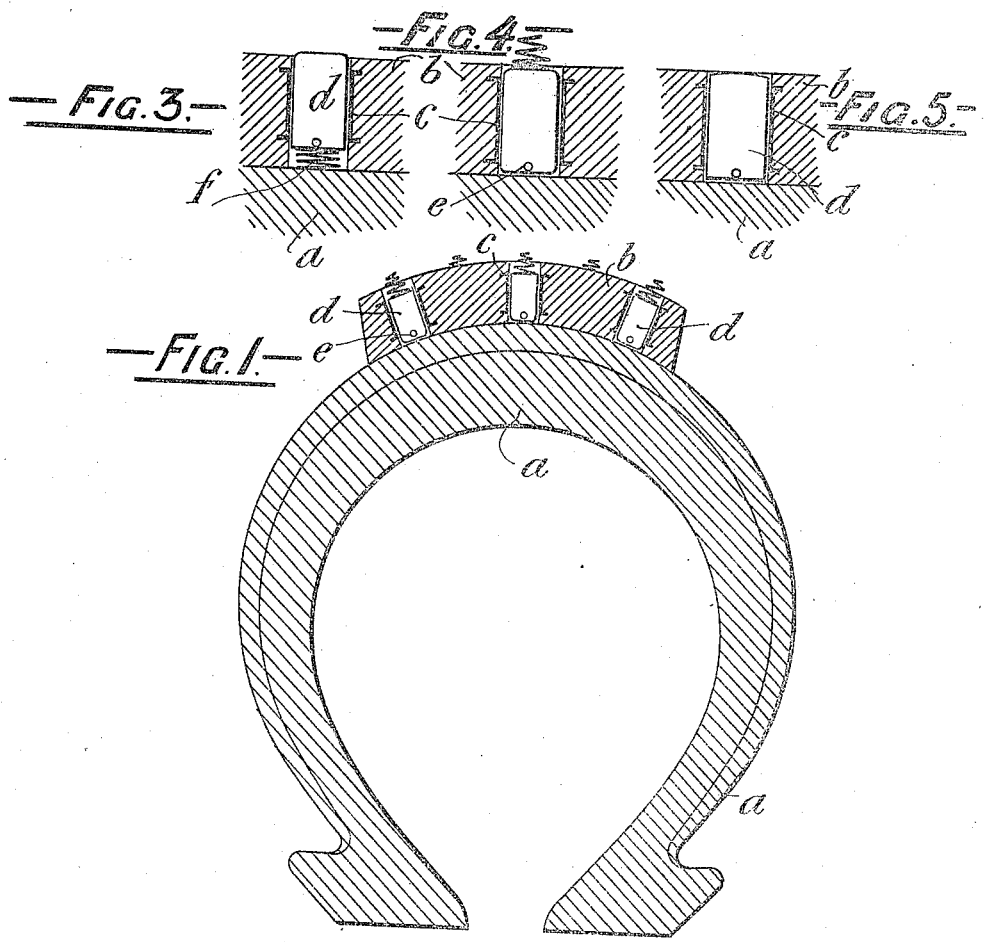

WILLIAM EDGAR MUNTZ, OF LONDON, ENGLAND.

TIRE FOR VEHICLES.

1,307,208.   Specification of Letters Patent.   Patented June 17, 1919.

Application filed April 6, 1914. Serial No. 829,897.

*To all whom it may concern:*

Be it known that I, WILLIAM EDGAR MUNTZ, a subject of the King of Great Britain, and resident of 6 Bream's Buildings, Chancery Lane, London, England, late of His Majesty's Public Works Department, India, have invented new and useful Improvements Relating to Tires for Vehicles, of which the following is a specification.

Tires for vehicles, particularly pneumatic tires, are sometimes fitted with projecting metal studs to prevent skidding or side slipping.

These studs are usually riveted through the tread which is affixed to the tire and have in themselves no individual resilience and in fact detract considerably from the resilience of the tire. Moreover, these riveted studs, although they act well on roads which are both soft and slippery like muddy Macadam roads, are actually detrimental when the roads are slippery and hard like wet asphalt. Besides causing skidding, which they are intended to prevent, on hard and slippery roads, the riveted studs themselves are subjected to grinding friction and great wear as their ends are always protruding beyond the surface of the tread whatever the condition of the surface upon which they bear.

My object is to provide studs which will accommodate themselves to the condition and character of the road surface either hard or soft and so operate efficiently as a non-skid without subjecting themselves to undue wear.

According to my invention I impart resilient capabilities to the studs individually.

This may be effected either by making the studs partly in the form of a coiled spring or by fitting them in eyelets so that they will slide and partake of the resilience of the support or backing against which they bear, or both these devices may be simultaneously employed. The backing will be the elastic portion of the tire assisted if desired by a coiled spring.

I have illustrated my invention in the accompanying drawing in which:—

Figure 1 shows a tire cover in cross section and

Fig. 2 part of a tire cover in plan view.

Figs. 3, 4, and 5 are detached views showing different ways of providing individual resilience for the tire studs.

$a$ is the cover and $b$ is the tread affixed thereto. These may be of any suitable materials. The pneumatic tube is not shown.

In the tread $b$ are numerous cylindrical holes in which are fixed, in any suitable manner, eyelets or guides $c$. The manner of fixing the eyelets illustrated is by flanges turned outwardly into the material of the tread, or they may be otherwise secured, but preferably the eyelets will be expanded after insertion in their holes. A particularly advantageous way of fixing the eyelets would be to have two or more little pins with heads countersunk into the metal of the eyelet which the stud itself would hold in position. This would have the advantage of allowing the eyelets to be drawn if broken or worn after use. Within the eyelets studs $d$ are arranged to slide. These studs which are prevented from coming out of their eyelets (for instance by means of transverse pins $e$ or small lugs or projections) may be formed as shown in Fig. 4 at their outer ends, that is to say as spiral springs. Figs. 3 and 5 show studs with solid ends, this form of stud depending only for its resilience on the elastic backing provided by the air in the pneumatic tire and its rubber covering assisted in the case of Fig. 3 by the spring $f$. The form of stud in Fig. 4 has the elastic backing without the spiral spring $f$ seen in Fig. 3.

In operation the elastic backing of the studs will allow the same to yield as and when required, and on the other hand the same elastic backing will cause the ends of the studs to protrude sufficiently to give a grip on the road when the tread is compressed by the weight of the vehicle on the ground and the road surface is not so hard as to resist the effort of the studs to project.

What I claim and desire to secure by Letters Patent in the United States is:—

A vehicle tire provided with a relatively elastic tread permanently forming a part of the body of the tire, the tread being provided with a series of holes therethrough, eyelets countersunk at both their extremities and fixed rigidly in the said holes, and studs free to move endwise with a sliding fit within the eyelets, the said studs being of such length that they will, when the weight of the vehicle is superimposed on the compressible tread, project sufficiently to penetrate mud or other soft material covering the surface of the road but will be retracted within the tread when it is in contact with asphalt or other hard road material.

In testimony whereof I have signed my name to this specification in the presence of two subscribing witnesses.

WILLIAM EDGAR MUNTZ.

Witnesses:
L. A. NEWTON,
E. C. WALKER.

Copies of this patent may be obtained for five cents each, by addressing the "Commissioner of Patents, Washington, D. C."